April 11, 1967   C. WEIGANG   3,313,041
OPTICAL TEACHING DEVICE
Filed April 6, 1964   2 Sheets-Sheet 1

INVENTOR.
Carl Weigang
BY
Michael J. Striker
Attorney

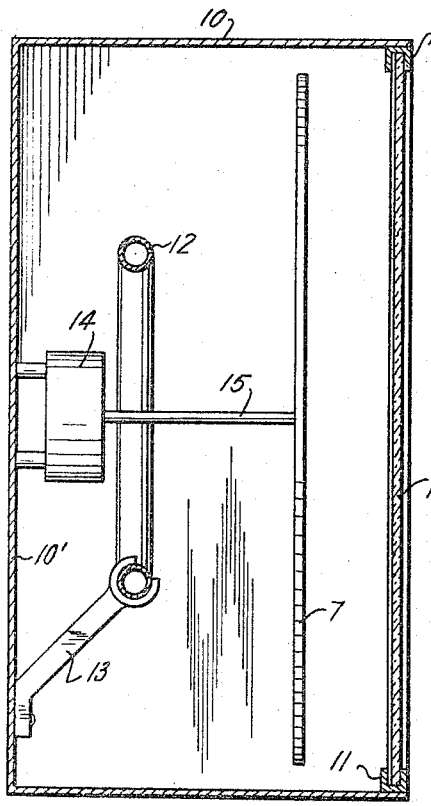
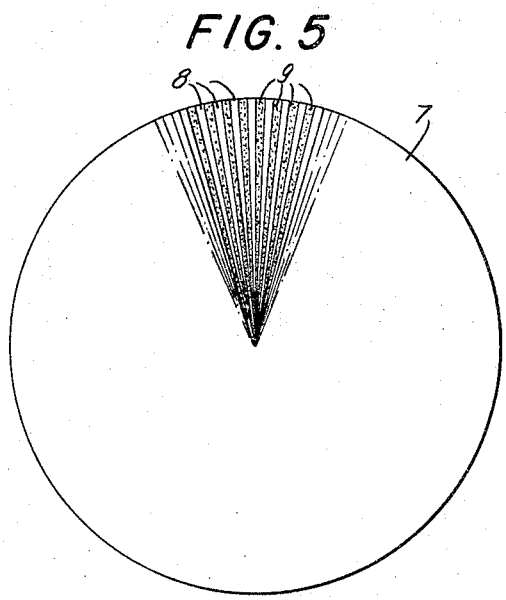
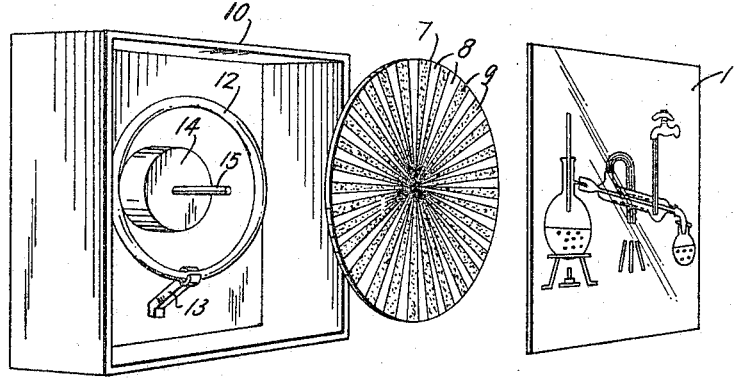

United States Patent Office 3,313,041
Patented Apr. 11, 1967

3,313,041
OPTICAL TEACHING DEVICE
Carl Weigang, Hauptstrasse 10, Neubiberg, near Munich, Germany
Filed Apr. 6, 1964, Ser. No. 357,389
11 Claims. (Cl. 35—13)

The present invention relates to an optical teaching device for producing an optical effect of movement in a picture.

Teachers use, for demonstration purposes, many pictures which are presented to the pupils either in the form of large prints or which are projected as still pictures or as moving pictures on a screen. Prints and projected still pictures have the disadvantage that no movement is shown thereon so that such pictures do not lend themselves readily to demonstrate a process to the pupils, whereas moving pictures have the disadvantage that the projected sequence of pictures changes so fast that the teacher sometimes cannot properly follow with his explanations the fast changing sequence.

It is an object of the present invention to provide for an optical teaching device which overcomes the disadvantage of still pictures as well as of moving pictures mentioned above.

It is a further object of the present invention to provide for an optical teaching device which produces an optical effect of movement in a picture to increase the interest of the pupils looking at the same.

It is an additional object of the present invention to provide for an optical teaching device producing an optical effect of movement in a picture and which is constructed of a few and simple parts so the device can be manufactured and sold at a reasonable cost and so that the device will stand up properly under extended use.

With these objects in view, the optical teaching device according to the present invention comprises a display plate of transparent material having a picture reproduced thereon having portions in which an optical effect of movement is to be produced, which portions have a greater transparency than the remainder of the picture. The device includes further a light source rearwardly of the display plate spaced therefrom, and a movable shutter means between the light source and the picture and having adjacent narrow strip-shaped alternating transparent and opaque portions extending transverse to the movement of the shutter and inclined with respect to the portions of greater transparency in the display plate so as to produce during movement of the shutter means and illumination of the display plate by the light source an optical effect of movement in the portions of greater transparency of the picture.

Preferably the shutter means are in form of a circular shutter disc which is mounted turnably about its axis between the light source and the display plate. In such circular shutter discs the narrow alternating opaque and transparent portions are preferably wedge shaped and extend radially from the axis of the circular disc. An electric motor may be used for rotating the disc about its axis and the arrangement is preferably made in such a way that the speed of the motor may be changed. The various components of the device are preferably enclosed in a box-shaped casing with the display plate extending transversely over an open end of this casing. Preferably, the open end of this casing has a means for holding the display plate exchangeable thereon, so that one display plate may be easily displaced against another one.

The novel features which are considered as characteristic for the invention are set forth in particular in the appended claims. The invention itself, however, both as to its construction and its method of operation, will be best understotod from the following description of specific embodiments when read in connection with the accompanying drawings, in which:

FIG. 4 is a front view of a shutter disc used in the device;

FIG. 5 is a sectioned side view of the complete device; and

FIG. 6 is a perspective, exploded view of the device shown in FIG. 5.

Figure 1:
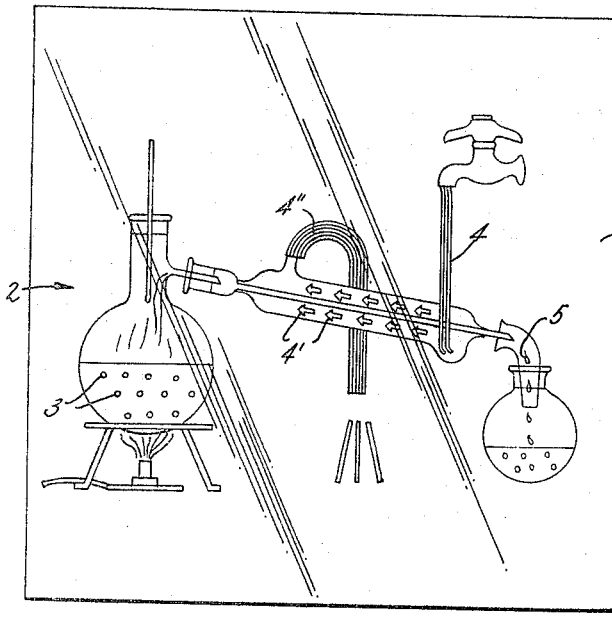
FIG. 1 is a front view of a display plate having a picture produced thereon having portions in which an optical effect of movement is to be produced.

FIG. 1 shows the front side of a display plate 1 usable in the device of the present invention and the display plate has a picture reproduced thereon. It is to be understood that the picture 2 shown in FIG. 1 is given only as an example and the picture shown in FIG. 1 illustrates laboratory equipment for carrying out a distillation process. The picture shows by way of example a heated flask containing a liquid to be distilled and the vapor produced in the upper portion of the flask passes through a central tube of a cooler to be condensed therein and the condensed liquid passes in form of drops into a receptacle. The picture 2 has portions in which an optical effect of movement is to be produced by the device, and these portions are shown in FIG. 1 as gas bubbles 3, bubbling up in the liquid in the flask, a stream of water 4 entering into the cooler, a stream of water passing through the cooler as indicated by the arrows 4′, a stream of water discharged from the cooler indicated at 4″, and a series of drops 5 of condensed liquid passing from the end of the cooler into the receptacle. The plate 1 is made from transparent material, for instance, clear plastic, and the picture 2 is reproduced thereon, in a known manner, preferably in transparent colors.

Figure 2:
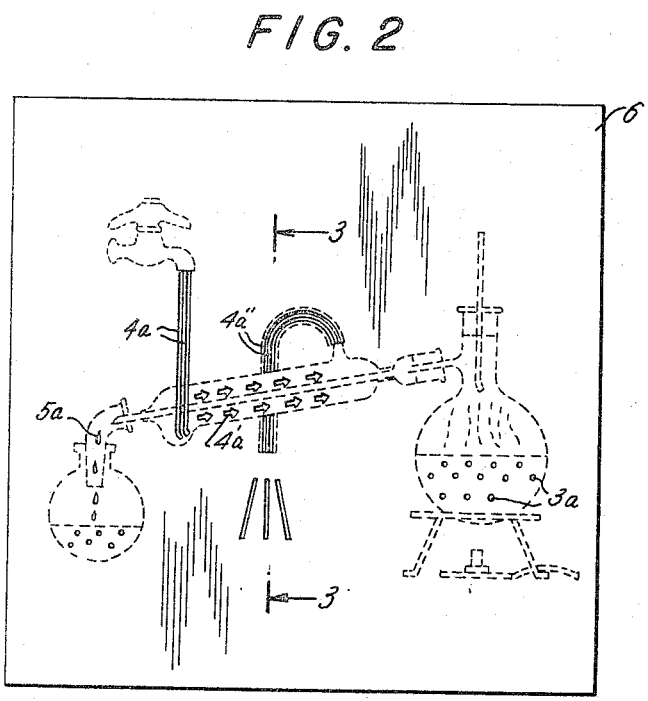
FIG. 2 is a rear view of the plate shown in FIG. 1.
Figure 3:
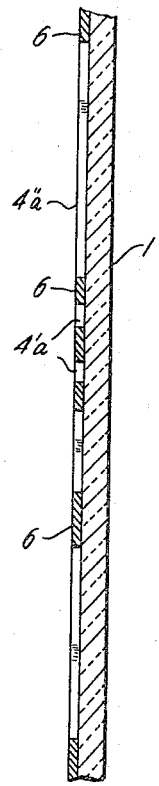
FIG. 3 is a cross section of FIG. 2 taken along line 3—3 of FIG. 2.

The rear face of the plate 1 shown in FIG. 2 is covered with a layer of translucent material, that is a material which is considerably less light permeable than the colors of the picture, except at the portions thereof in which an optical effect of movement in the picture at the front face of the plate is to be produced, in other words, the layer is provided with cutouts 3a, 4a, 4′s, 4″a, and 5a corresponding in location to the portions 3–5 of the picture, so that these portions of the picture in which an optical effect of movement is to be produced will have a greater transparency than the remainder of the picture.

The device includes further a movable shutter means, preferably in the form of a circular shutter disc 7, arranged rearwardly of the plate 1 turnable about its axis. The shutter disc 7 has preferably a radius equal to one side of the square display plate 1. As can be seen from FIG. 1 the shutter disc has adjacent narrow wedge shaped alternating transparent portions 8 and opaque portions 9 extending radially outwardly from the axis of the disc. The shutter disc 7 may be formed, for instance, from substantially glass clear plastic and the opaque portions may be produced by printing, painting or applying wedge shaped black strips thereon.

The display plate 1 and the shutter disc 7 are preferably mounted in a box shaped casing 10 as shown in FIGS. 5 and 6. The box shaped casing preferably has a rear wall 10′ and is open at the side opposite to this rear wall, and a display plate 1 is mounted on the casing 10 extending transversely over the open end thereof. The box shaped casing 10 may have along the upper and lower edges, defining the open end thereof, a pair of U-shaped guide rails 11 in which the display plate 1 is slidably mounted so that the display plate can be easily displaced against another display plate having a different picture thereon. The shutter disc 7 is mounted in the casing 10 parallel and rearwardly of the display plate 1 and the shutter disc may be driven, for instance, by an electric motor 14 having a drive shaft 15 connected to the center of the shutter disc for turning the same about its axis. The motor 14 may be mounted in known manner on the rear wall 10′ of the casing 10. A light source 12 is mounted in the casing as shown in FIGS. 5 and 6 rearwardly of the shutter disc 7. The light source may be in the form of an annular fluorescent lamp 12 carried by brackets 13 on the rear wall 10′ of the casing and in this case the drive shaft 15 may extend through the center of the annular fluorescent lamp as best shown in FIG. 5. The necessary transformer and ballast for this lamp, which are of known construction, are for simplicity's sake not shown in the drawing and the necessary conductors and switch means for lamp and motor as well as any means for regulating the speed of the motor are likewise omitted from the drawings for the sake of clarity.

The device above describd will operate as follows:

When the light source 12 is energized, the light rays emanating therefrom will pass through the transparent portion of the shutter disc 7 to illuminate the picture on the display plate 1. During fast rotation of the shutter disc 7 about its axis portions the transparent and opaque strips thereon will move longitudinally with respect to the portions of greater transparency in the picture so as to produce during rotation of the shutter disc 7 an optical effect of movement in these portions of greater transparency. It should be noted that the portions of greater transparency in the picture are arranged to extend transversely to the alternating transparent and opaque strips of the shutter disc passing at any instant behind these portions. Due to this arrangement, in the specific picture shown in FIG. 1, for example, the bubbles 3 will be during rotation of the shutter disc in clockwise direction, alternatingly illuminated and blacked out as the transparent and opaque portions of the disc 7 pass behind the respective bubble so that these bubbles seem to move upwardly in the flask, while the droplets 5 will seem to drop downwardly into the receptacle, and as alternating transparent and opaque portions of the disc will cross the portions 4, 4′ and 4″ illustrating the streams of cooling water they will reproduce in these portions of the picture likewise the effect of streaming water.

It will be understood that each of the elements described above, or two or more together, may also find a useful application in other types of optical teaching devices differing from the types described above.

While the invention has been illustrated and described as embodied in an optical teaching device for producing optical effect of movement in a picture, it is not intended to be limited to the details shown, since various modifications and structural changes may be made without departing in any way from the spirit of the present invention.

As mentioned before, the picture shown in FIG. 1 is given only as an example and many different pictures may be used in an optical teaching device according to the present invention. Such pictures may include pictures of mechanical or electrical machines or other arrangements in which an optical effect of movement should be produced.

Instead of forming portions of greater transparency in the picture by providing a layer of translucent material on the rear face of the plate, such portions may also be produced on the plate by reproducing thereon a picture in translucent colors and leaving cutouts in the picture at those portions in which the optical effect of movement should be produced so that these portions will be perfectly clear. Furthermore, the alternating transparent and opaque portions of the shutter disc can also be produced by forming the shutter disc from opaque material and by forming spaced wedge-shaped closely adjacent and radially extending slits in the disc of opaque material, which slits will form the transparent portions thereof.

Obviously, it is also possible to use different light sources for illuminating of the plate than that shown in FIGS. 5 and 6.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An optical teaching device for producing an optical effect of movement comprising, in combination, a display plate of transparent material having a transparent picture reproduced thereon having portions in which an optical effect of movement is to be produced, said portions having a greater transparency than the remainder of said picture; a light source rearwardly of said display plate spaced therefrom; and movable shutter means between said light source and said dispaly plate arranged spaced from the latter and having adjacent narrow strip-shaped alternating transparent and opaque portions extending inclined to the direction of movement of said shutter means so as to directly illuminate with relatively great intensity strips of said picture portions of greater transparency, such strips corresponding to said narrow strip-shaped portions of said movable shutter means, and to illuminate strips of said picture portions of greater transparency located between said first-mentioned strips and corresponding to said narrow strip-shaped opaque portions of said shutter means with smaller intensity by scattered light created by said direct light after passage thereof through said narrow strip-shaped transparent portions of said shutter means, whereby during movement of said shutter means an optical effect of movement in said portions of greater transparency is obtained.

2. An optical teaching device as defined in claim 1, wherein said display plate comprises a layer of translucent material applied to the rear face thereof except to said portions of said picture so that said portions will thereby have said greater transparency.

3. An optical teaching device as defined in claim 1, wherein said portions of said picture are narrow portions extending at least in two directions angularly displaced from each other.

4. An optical teaching device as defined in claim 1; further comprising a casing having an open end, said display plate being mounted on said open end extending thereacross and said light source and shutter means being located in said casing; and means removably holding said display plate on said casing so that said display plate may be exchanged against another one having a different picture thereon.

5. An optical teaching device for producing an optical effect of movement comprising, in combination, a display plate of transparent material having a picture reproduced thereon having portions in which an optical effect of movement is to be produced, said portions having a greater transparency than the remainder of said picture; a light source rearwardly of said display plate spaced therefrom; and shutter means, including a shutter disc turnable about an axis normal to said display plate and mounted between said light source and said display plate arranged spaced from the latter and having adjacent narrow strip-shaped alternating transparent and opaque portions extending inclined to the direction of movement of said shutter means so as to directly illuminate with relatively great intensity strips of said picture portions of greater transparency, such strips corresponding to said narrow strip-shaped portions of said movable shutter means, and to illuminate strips of said picture portions of greater transparency located between said first-mentioned strips and corresponding to said narrow strip-shaped opaque portions of said shutter means with smaller intensity by scattered light created by said direct light after passage thereof through said narrow strip-shaped transparent portions of said shutter means, whereby during movement of said shutter means an optical effect of movement in said portions of greater transparency is obtained.

6. An optical teaching device for producing an optical effect of movement comprising, in combination, a display plate of transparent material having a picture reproduced thereon having portions in which an optical effect of movement is to be produced, said portions having a greater transparency than the remainder of said picture; a light source rearwardly of said display plate spaced therefrom; and shutter means, including a circular shutter disc turnable about its axis and mounted between said light source and said display plate arranged spaced from the latter and having adjacent narrow strip-shaped alternating transparent and opaque portions extending inclined to the direction of movement of said shutter disc and extending radially of said axis so as to directly illuminate with relatively great intensity strips of said picture portions of greater transparency, such strips corresponding to said narrow strip-shaped portions of said circular shutter disc, and to illuminate strips of said picture portions of greater transparency located between said first-mentioned strips and corresponding to said narrow strip-shaped opaque portions of said circular shutter disc with smaller intensity by scattered light created by said direct light after passage thereof through said narrow strip-shaped transparent portions of said circular shutter disc, whereby during movement of said circular shutter disc an optical effect of movement in said portions of greater transparency is obtained.

7. An optical teaching device as set forth in claim 6, wherein said display plate and said shutter disc are made of plastic material.

8. An optical teaching device for producing an optical effect of movement comprising, in combination, a display plate of transparent material having a picture reproduced thereon having narrow portions extending in different directions in which an optical effect of movement is to be produced, said portions having a greater transparency than the remainder of said picture; a light source rearwardly of said display plate spaced therefrom; and shutter means, including a circular shutter disc turnable about its axis and mounted between said light source and said display plate arranged spaced from the latter and having adjacent narrow strip-shaped alternating transparent and opaque portions extending inclined to the direction of movement of said shutter disc and extending radially of said axis so as to directly illuminate with relatively great intensity strips of said picture portions of greater transparency, such strips corresponding to said narrow strip-shaped portions of said circular shutter disc, and to illuminate strips of said picture portions of greater transparency located between said first-mentioned strips and corresponding to said narrow strip-shaped opaque portions of said circular shutter disc with smaller intensity by scattered light created by said direct light after passage thereof through said narrow strip-shaped transparent portions of said circular shutter disc, whereby during movement of said circular shutter disc an optical effect of movement in said portions of greater transparency is obtained.

9. An optical teaching device as defined in claim 8, and further comprising means for rotating said shutter disc about its axis.

10. An optical teaching device as defined in claim 8, and further comprising means for rotating said shutter disc about its axis with variable speed.

11. An optical teaching device for producing an optical effect of movement comprising, in combination, a display plate of transparent material having a picture reproduced thereon having portions in which an optical effect of movement is to be produced, said display plate having a layer of translucent material applied to the rear face thereof except to said portions of said picture so that the plate will have at said portions a greater transparency than at the remainder thereof; a light source rearwardly of said display plate spaced therefrom; and movable shutter means between said light source and said picture and having adjacent narrow strip-shaped alternating transparent and opaque portions extending transverse to the movement of said shutter means and inclined to the portions of greater transparency in said display plate so as to produce during movement of said shutter means and illumination of said display plate by said light source an optical effect of movement in said portions of greater transparency.

References Cited by the Examiner

UNITED STATES PATENTS

| | | | |
|---|---|---|---|
| 982,685 | 1/1911 | Medvecky et al. | 40—106.53 |
| 1,009,839 | 11/1911 | Hata | 40—106.52 |
| 1,382,226 | 6/1921 | Pyper | 40—106.53 |
| 2,074,249 | 3/1937 | Bloh | 40—106.53 |
| 2,222,309 | 11/1940 | Dunkelberger | 35—13 |
| 2,272,946 | 2/1942 | Hotchner | 40—106.53 |
| 2,915,843 | 12/1959 | Pabst et al. | 40—106.53 |
| 3,054,204 | 9/1962 | Yates | 40—106.52 |
| 3,184,872 | 5/1965 | Way | 40—106.53 |
| 3,205,598 | 9/1965 | Grosse | 40—106.53 |

EUGENE R. CAPOZIO, *Primary Examiner.*

S. M. BENDER, W. NIELSEN, *Assistant Examiners.*